United States Patent [19]
Carlsen et al.

[11] Patent Number: 5,775,181
[45] Date of Patent: Jul. 7, 1998

[54] METHOD OF MAKING A SAWBLADE TOOTH FORM

[75] Inventors: Daniel J. Carlsen, Baltimore; George F. Parker, Severna Park, both of Md.

[73] Assignee: Black & Decker Inc., Newark, Del.

[21] Appl. No.: 730,425

[22] Filed: Oct. 10, 1996

Related U.S. Application Data

[63] Continuation of Ser. No. 292,903, Aug. 19, 1994, abandoned.

[51] Int. Cl.$^6$ ............................................. B23D 65/02
[52] U.S. Cl. ........................................... 76/112; 76/29
[58] Field of Search ........................... 76/112, 25.1, 75, 76/76, 29

[56] References Cited

U.S. PATENT DOCUMENTS

| | | |
|---|---|---|
| 29,982 | 9/1860 | Mason . |
| 71,473 | 11/1867 | Emerson ............................ 76/29 |
| 133,828 | 12/1872 | Brown . |
| 229,772 | 7/1880 | Suisse . |
| 352,624 | 11/1886 | Loughlin . |
| 391,843 | 10/1888 | Gray . |
| 503,522 | 8/1893 | Bowles . |
| 790,072 | 5/1905 | McLean . |
| 1,336,209 | 4/1920 | Driver . |
| 2,224,867 | 12/1940 | Hechler . |
| 2,535,439 | 12/1950 | McEwan ............................ 76/75 |
| 2,633,880 | 4/1953 | Mattson . |
| 2,635,327 | 4/1953 | Enlow . |
| 2,637,355 | 5/1953 | Chapin . |
| 2,648,360 | 8/1953 | Pall . |
| 2,750,669 | 6/1956 | Hohmann . |
| 2,757,697 | 8/1956 | Simmons et al. . |
| 3,071,027 | 1/1963 | Hiltebrand .......................... 76/112 |
| 3,091,266 | 5/1963 | Nelson . |
| 3,117,472 | 1/1964 | Mingus et al. ..................... 76/29 |
| 3,208,310 | 9/1965 | Dunn ................................ 76/112 |
| 3,331,265 | 7/1967 | Kane . |
| 3,374,815 | 3/1968 | Anderson, Jr. et al. . |
| 3,630,699 | 12/1971 | Catlin .............................. 76/112 |
| 3,745,869 | 7/1973 | Ludwig . |
| 4,034,630 | 7/1977 | Nowak .............................. 76/112 |
| 4,325,272 | 4/1982 | Kelsey .............................. 76/112 |
| 4,604,933 | 8/1986 | Lesher et al. . |
| 4,627,165 | 12/1986 | Gibson . |
| 4,693,145 | 9/1987 | Gustavsson ....................... 76/112 |
| 4,867,026 | 9/1989 | Henning et al. . |
| 5,016,497 | 5/1991 | Sundstrom ...................... 76/112 X |

FOREIGN PATENT DOCUMENTS

| | | |
|---|---|---|
| 3939205 | 5/1990 | Germany ........................... 76/112 |
| 578405 | 8/1976 | Switzerland . |
| 812574 | 4/1977 | U.S.S.R. . |
| 522138 | 6/1940 | United Kingdom . |

*Primary Examiner*—Eugenia Jones
*Assistant Examiner*—Charles Goodman
*Attorney, Agent, or Firm*—Harness, Dickey & Pierce, P.L.C.

[57] ABSTRACT

A saw blade has a plurality of teeth with each tooth formed by a beveled leading face, a beveled trailing face and a chamfered surface located on the trailing face of each tooth. The trailing and leading faces are beveled in opposite directions in alternate order throughout the saw blade prior to the forming of the chamfered surface. The beveled leading face of each tooth intersects the chamfered surface on the trailing face of each tooth to form a curved cutting edge having a negative rake angle. The beveled faces are manufactured by first forming a plurality of rough-formed gullets. The rough-formed gullets are then finished-formed into beveled gullets by a cold-forming operation prior to the grinding of the chamfered surface to form the curved cutting face of the tooth.

15 Claims, 8 Drawing Sheets

METHOD OF MAKING A SAWBLADE TOOTH FORM

This is a continuation of U.S. patent application Ser. No. 08/292,903, filed Aug. 19, 1994, now abandoned.

FIELD OF THE INVENTION

The present invention relates to saw blades. More particularly, the present invention relates to a unique design of saw tooth profile for saw blades and a method of manufacturing saw blades having this unique design of saw tooth profile.

BACKGROUND OF THE INVENTION

A typical saw blade has a blade edge made up of a sequence of sharp points which are referred to as teeth. These teeth cut a trench or kerf that allows the free entry of the saw blade to cut an article. The cutting action of the saw blade involves urging the article to be cut transversely into the rotating or longitudinally moving saw blade or transversely urging the moving saw blade into the article. As the saw blade and article are urged together, the teeth of the saw blade dig in and remove particles from the article in a rapidly repetitive action. By this repetitive action, the kerf is increased in depth until the article is cut. This cutting action which removes a portion of the article is substantially different than "slicing" where the fibers of the article are simply moved.

Figure 1:
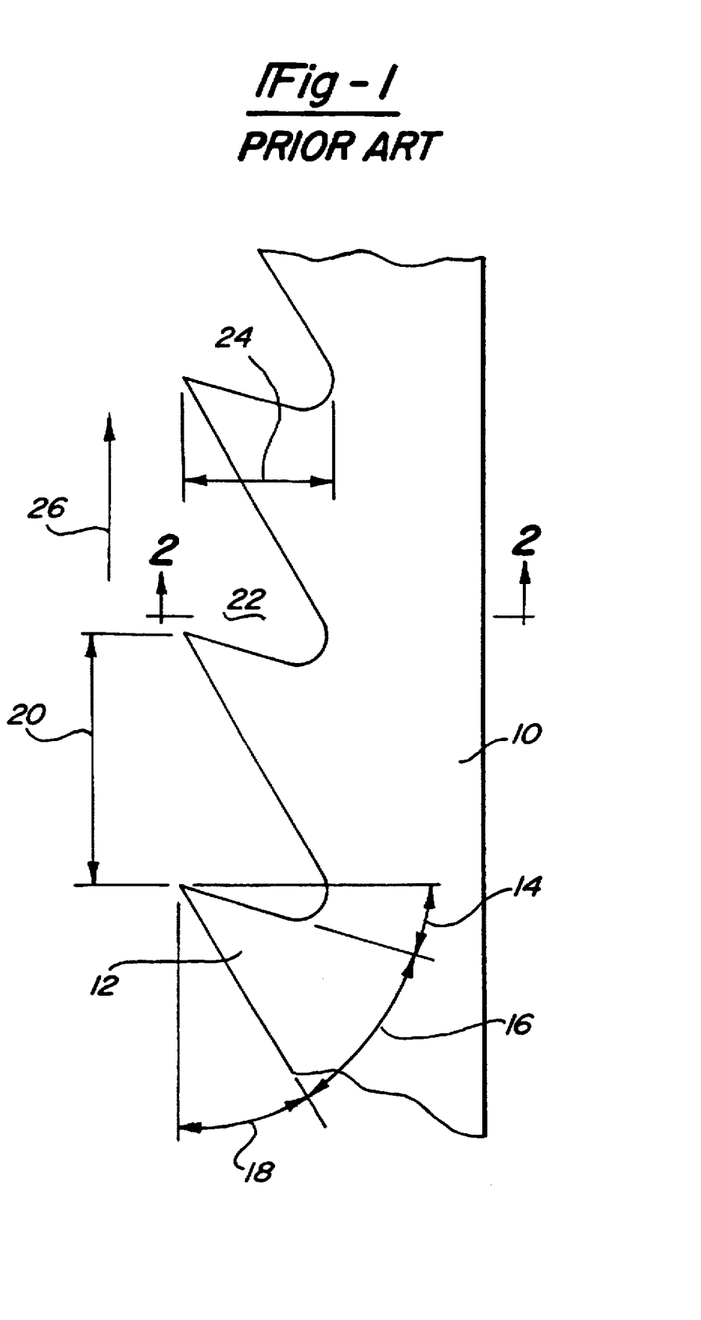
FIG. 1 is a side elevational view of the tooth-form for a conventional saw blade.
Figure 2A:
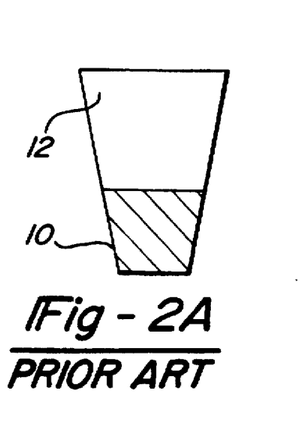
FIG. 2A is a view in the direction of arrows 2—2 in FIG. 1 showing saw blade clearance achieved by taper grinding.
Figure 2B:
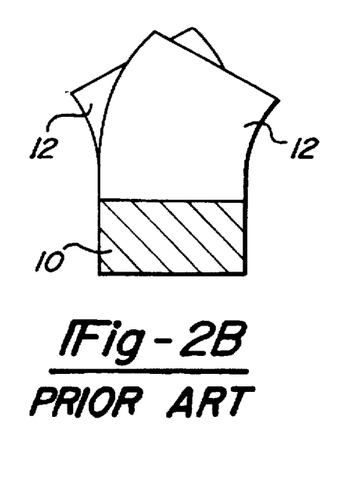
FIG. 2B is a view similar to that of FIG. 2A but showing saw blade clearance achieved by offsetting.

FIG. 1 illustrates a portion of a conventional saw blade 10 showing the profile of a conventional tooth 12. Tooth 12 includes a positive hook angle 14, a tooth angle 16 and a clearance angle 18. Other nomenclature used in the description of saw teeth include the tooth pitch or spacing 20, the tooth gullet 22 and the depth of the gullet 24. The direction of cut for saw blade 10 is shown by arrow 26. During the cutting of an article by a saw blade, there must be sufficient clearance between the saw blade and the sawn surfaces or sidewalls of the kerf being created in order to eliminate binding or friction between the saw blade and the cut article. This clearance can be achieved by either taper grinding or offsetting the saw tooth. Taper grinding, shown in FIG. 2A, is a process that removes the material on the sides of the saw blade to make the cutting tip the widest part on the blade. Offsetting, shown in FIG. 2B, is a process that bends or places a "set" in the saw tooth to make the cutting tip the widest part on the blade. Either method, taper grinding or offsetting, provides the necessary clearance between the saw blade and the sidewalls of the kerf being made in the article to eliminate any binding of the saw blade in the kerf.

Figures 3A, 3B:
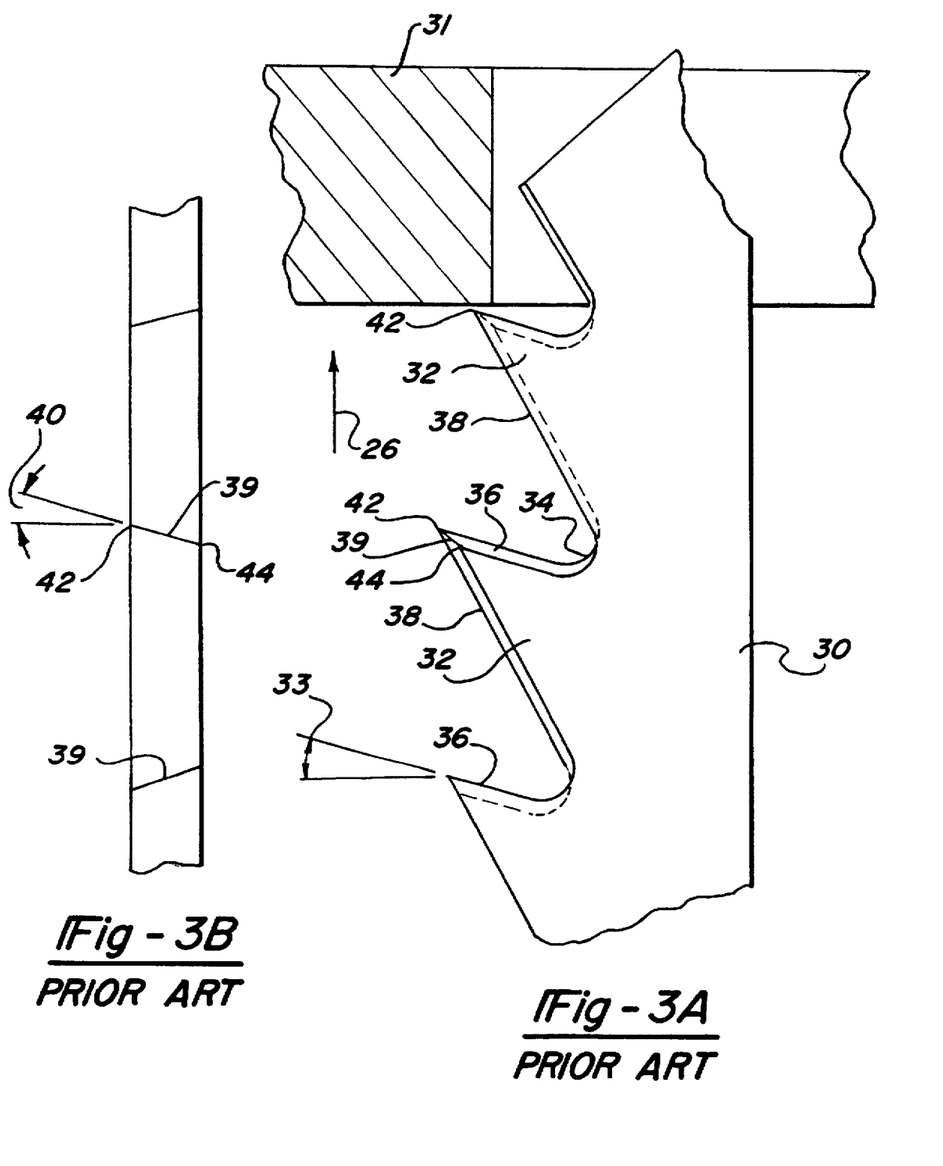
FIG. 3A illustrates the tooth-form for a conventional fleam-ground saw blade having beveled gullets.
FIG. 3B is a top plan view of the saw blade shown in FIG. 3A.

Various improvements to the conventional tooth profile shown in FIG. 1 have been proffered. FIGS. 3A and 3B illustrate a saw blade 30 cutting into an article 31. Saw blade 30 has a plurality of teeth 32 having a positive hook angle 33 which incorporate "fleam grinding" or alternate beveling of each gullet 34 between the plurality of teeth 32. In particular, the plurality of teeth 32 have their front faces 36 and their rear faces 38 oppositely beveled. This is accomplished by having the bevel on the front gullet of each tooth 32 facing in the opposite direction to the bevel on the rear gullet of each tooth 32 in alternate order throughout the saw blade. This beveled tooth profile generates in a tooth point of substantially triangular prismatic shape which better enables the teeth to effect the removal of portions of the article. The triangular prismatic tooth profile is manufactured by grinding each tooth gullet 34 in a direction which is opposite to that of an adjacent tooth gullet 34. Grinding each gullet 34 simultaneously grinds a front face 36 of one tooth and a rear face 38 of the tooth adjacent to it. This grinding or beveling of each gullet 34 is normally done at a compound angle, which causes the bottom of each gullet 34 between the teeth 32 to slope in an upwards and a backwards direction due to the beveled front face of each tooth meeting the beveled rear face of the tooth in front of it in an oblique line. This beveling of the gullets is designed to aid in the removal of cut material from the gullets. However, the conventional fleam ground blade still packs the gullets with chips and dust. The compound beveling of the gullets creates a dead space or neutral area in the bottom of the gullet due to one face of the gullet directing chips to one side of the blade with the opposite face of the gullet directing chips to the opposite side of the blade. This dead space or neutral area causes the undesirable accumulation of chips within the base of the gullet. This problem is especially acute when the thickness of the material being cut is large or exceeds the stroke of the blade, which is typically between one-quarter and one-half of an inch. This conventional compound beveling creates a tooth cutting face 39 having a conventional negative rake angle 40. (FIG. 3B). The rake angle of a saw tooth is defined as the angle between a line perpendicular to the cutting direction and a line extending generally parallel to the cutting edge of the saw tooth. When the rake angle is towards the direction of cut it is termed a negative rake angle. When the rake angle is away from the direction of cut it is termed a positive rake angle. A negative rake angle provides an aggressive cutting tooth and causes the highest (relative to the base of the gullet), leading point of the cutting face on the conventional fleam-ground tooth-form to always contact the workpiece first during the forward stroke of the cutting blade, with the remainder of the cutting face being angled downward and rearwardly away from the surface being cut. This can be seen in FIGS. 3A and 3B where the higher, leading point 42 contacts the workpiece first and the lower, trailing point 44 will contact the workpiece last during the cutting stroke.

Various other tooth profiles for saw blades have been proposed. However, most of these earlier known designs have not experienced widespread commercial use as they typically do not lend themselves to automated manufacturing processes and therefore are too costly to produce. Consequently, there is a need for improving the known manufacturing processes to mass-produce improved saw tooth profiles in a cost-effective manner.

SUMMARY OF THE INVENTION

The present invention provides the art with a saw blade having a body with a plurality of saw teeth having a unique tooth profile disposed along one face of the blade. The leading face of each saw tooth and the trailing face of each saw tooth are formed by a radiused beveled gullet. The gullet of the trailing face is beveled in an opposite direction to the gullet of the leading face in alternate order throughout the saw blade. A curved cutting edge is formed on the point of each tooth by the intersection of the leading face of each tooth and a planar surface formed generally perpendicular to the longitudinal axis of the saw blade and extending laterally across the width of the saw blade. The unique tooth profile of the present invention includes beveling of each gullet to create a negative rake angle and the utilization of large radiused gullets. These features co-act to reduce blade breakage, to provide an aggressive cut and to provide substantial improvement in the expulsion of the generated chips.

In addition to the unique profile of the saw teeth, the present invention provides the art with a unique and inexpensive manufacturing process for manufacturing the tooth profile according to the present invention using a single pass of a grinding wheel.

Other advantages and objects of the present invention will become apparent to those skilled in the art from the subsequent detailed description, appended claims and drawings.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Referring now to the drawings in which like reference numerals designate like or corresponding parts throughout the several views, there is shown in FIGS. 4 through 6A a saw blade incorporating the tooth profile according to the present invention which is designated generally by the reference numeral 100. Saw blade 100 comprises a body 102 having a plurality of teeth 104 and two side faces 106 and 108. Body 102 is shown, for exemplary purposes as a jigsaw blade. It is to be understood that the tooth profile of the present invention and the method of manufacturing the tooth profile of the present invention may be incorporated into any type of linear saw blade as well as any type of circular saw blade. Saw blade 100 cuts by being moved in the direction of the arrow 109 shown in FIGS. 4, 5 and 6A. Each tooth 104 is formed by two successive gullets 110, with each gullet 110 being located on opposite sides of tooth 104. Each gullet 110 is formed at a gullet angle 112 relative to the longitudinal axis 113 of body 102 and includes a frusto-conical shaped beveled contour 114 which is beveled in a direction to the side (towards one of the two faces 106 or 108) of saw blade 100. Each beveled contour 114 includes a minor radius 116 and a major radius 118. Teeth 104 have their front or leading faces 120 and their rear or trailing faces 122 oppositely beveled with the bevels on the gullet of leading face 120 facing in the symmetrically opposite direction to the bevel on the gullet of trailing face 122 in alternate order throughout saw blade 100. Each tooth 104 further includes a planar surface 124 located on trailing face 122 which extends laterally across the width of tooth 104 and is generally perpendicular to faces 106 and 108 of body 102.

A curved cutting edge 130 of each tooth 104 is formed by the intersection of beveled contour 114 on the gullet of leading face 120 of tooth 104 and planar surface 124 on trailing face 122. Two additional side cutting edges 132 and 134 are formed, respectively, by the intersection of beveled contour 114 with face 106 of body 102 and by the intersection of beveled contour 114 with face 108 of body 102. Cutting edge 130 begins the forming of the kerf during the cutting operation and side cutting edges 132 and 134 maintain the width of the kerf by continuously shaving the sides of the kerf throughout the cutting operation. Thus, as shown in FIGS. 4–6A, curved cutting edge 130 on each tooth 104 is angled toward the direction of cut, at what is defined as a negative rake angle 115. The beveled surfaces 114 and the negative rake angles of adjacent teeth 104 are angled in alternately opposite directions. The distance 140 between the tip of curved cutting edge 130 and the center of minor radius 116 defines the minor radius depth of each tooth 104.

Preferred dimensions, in millimeters and degrees, for saw blade 100 having various pitch tooth-forms are given in the chart below:

| TOOTH PITCH | BEVEL MINOR RADIUS (REF. NO. 116) | GULLET ANGLE (REF. NO. 112) | BEVEL ANGLE (REF. NO. 164) | MINOR RADIUS DEPTH (REF. NO. 140) |
| --- | --- | --- | --- | --- |
| 2.5 | 0.70 | 33.1 | 20.0 | .53 |
| 3.0 | 0.70 | 27.0 | 20.0 | .53 |
| 4.0 | 1.25 | 37.5 | 25.0 | .96 |

The parameters shown in the above chart can be varied in order to change the performance of the blade. Desirable ranges for the parameters listed in the above chart are given below:

TOOTH PITCH—The tooth pitch can range from zero up to the industry standard of the thickness of the material to be cut.

BEVEL MINOR RADIUS (Ref. No. 116)—This radius can be up to one-half of the tooth pitch.

GULLET ANGLE (Ref. No. 112)—This angle can range from 0° to 90°.

BEVEL ANGLE (Ref. No. 164)—This angle can range from 0° to 45° with the recommended bevel angle being between 10° and 30°.

MINOR RADIUS DEPTH (Ref. No. 140)—The minor radius depth is defined as the distance between the tip of the tooth and the center of the radius for the minor radius of the bevel contour. The optimum minor radius depth will be achieved when a curve circumscribed by the bevel minor radius is tangent to the planar surface (124) located on the trailing face of the tooth. If the minor radius depth exceeds the optimum depth, a cutting tooth will not be formed. If the minor radius depth is less than the optimum, various tooth cutting edges will be created depending upon the actual depth of the minor radius.

The preferred method of manufacturing the tooth profile for saw blade 100, shown in FIGS. 7–11, requires two punching operations, a cold-forming operation, a blanking operation and a grinding operation. The two punching operations rough-form gullets 110. After gullets 110 are rough-formed, the cold-forming operation finish-forms gullets 110 by cold-forming radiused contours 114. The particular design of saw blade is then blanked from the raw material, and the grinding operation forms cutting faces 130 by grinding surfaces 124.

Figure 7:
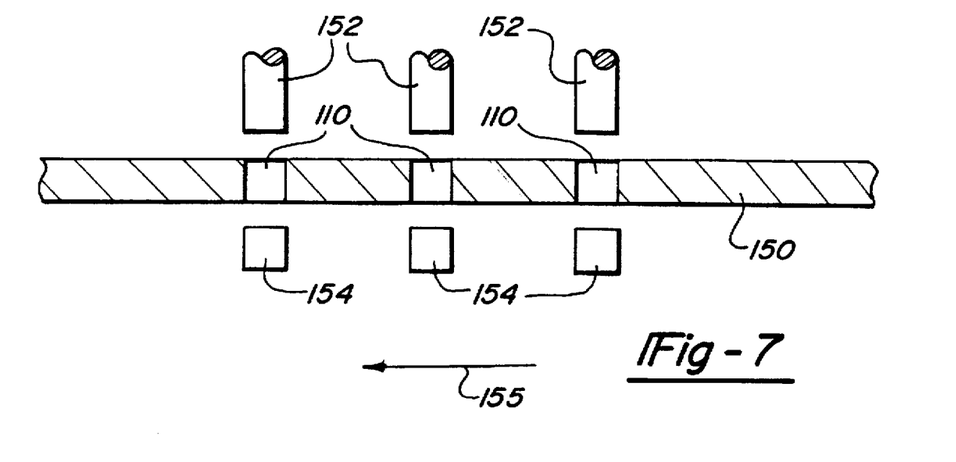
FIG. 7 illustrates a forming step of the manufacturing process of the present invention.
Figure 8:
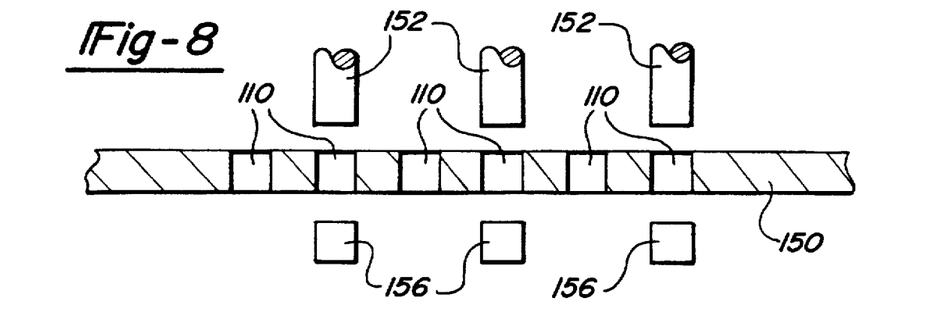
FIG. 8 illustrates an additional forming step of the manufacturing process of the present invention.

Referring now to FIGS. 7 through 11, the manufacturing process begins by positioning a strip of material 150 within a punching machine (not shown) having a plurality of generally cylindrical punches 152 as shown in FIG. 7. Typical materials which can be utilized to manufacture saw blade 100 from a single specification of material including SAE 1070 or SAE 1095 with SAE 1095 being the preferred material. While punches 152 are being shown for exemplary purposes as being cylindrical it is to be understood that punches 152 may be other shapes as required to form the desired shapes of gullets 110. Punches 152 are spaced at two times the tooth pitch. Thus, the punching operation depicted in FIG. 7 has just punched (rough-formed) the first one-half or every other gullet 110 by punching out a plurality of generally cylindrical plugs 154. The strip of raw material 150 is then indexed longitudinally in the direction shown by the arrow 155 shown in FIG. 7 to the next position and the punching operation illustrated in FIG. 8 is performed. FIG. 8 illustrates the punching or rough-forming of the remainder or other one-half of gullets 110 by punching out a second plurality of generally cylindrical plugs 156 by punches 152. With the completion of the punching operation depicted in FIG. 8, the complete set of gullets 110 have been rough-formed. Although the punching operations performed in FIGS. 7 and 8 are depicted as being accomplished using one set of punches 152, it is within the scope of the present invention to use two sets of punches with the first set performing the operation illustrated in FIG. 7 and the second set performing the operation illustrated in FIG. 8 if desired. In addition, for some tooth pitches, it may be desirable to punch or rough-form all of gullets 110 in one operation rather than the two illustrated.

Figure 9:
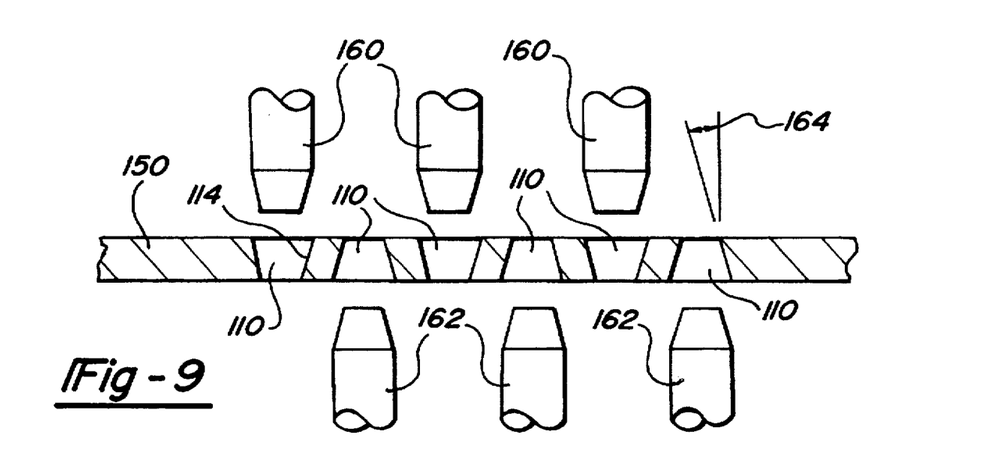
FIG. 9 illustrates an additional forming step of the manufacturing process of the present invention.

Referring now to FIG. 9, a cold-forming operation is illustrated which forms the blanked holes shown in FIGS. 7 and 8 with frusto-conical shaped beveled contours 114 within each gullet 110. A plurality of upper-forming dies 160 located adjacent the upper face of material 150 and a plurality of lower-forming dies 162 located adjacent the lower face of material 150 simultaneously enter the blanked holes created by the punching operations shown in FIGS. 7 and 8 to cold-form radius contours 114. Upper and lower-forming dies 160 and 162, shown in FIG. 9, are conically shaped dies which are capable of cold-forming frusto-conical shaped beveled contours 114 for each gullet 110 in symmetrically opposite directions in alternate order throughout saw blade 100 a bevel angle 164. Upper and lower-forming dies 160, 162 are each spaced at two times the desired tooth pitch. Lower-forming dies 162 are indexed longitudinally one tooth pitch relative to upper-forming dies 160. The spacing and positioning of upper-forming dies 160 in relationship to lower dies 162 produce the tooth profile for teeth 104 which have their leading faces 120 and their trailing faces 122 oppositely beveled at bevel angle 164. The bevels on one gullet face in the symmetrically opposite direction to the bevels on the adjacent gullet in alternate order throughout saw blade 100.

Figure 10:
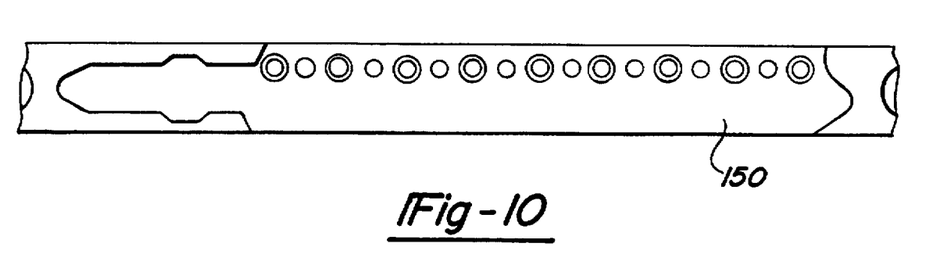
FIG. 10 illustrates an additional forming step of the manufacturing process of the present invention.

Upon completion of the cold-forming operation illustrated in FIG. 9, saw blade 100 is blanked from the strip of raw material 150 as shown in FIG. 10. The blanking operation depicted in FIG. 10 illustrates, for exemplary purposes, a jigsaw blade. It is to be understood that the tooth profile and method of manufacturing of the present invention may be incorporated into any type of linear saw blade as well as any type of circular saw blade. The operation illustrated in FIGS. 7 through 10 is a continuous operation on the strip of raw material 150 with material 150 being continuously indexed in the direction of arrow 155.

Figure 11:
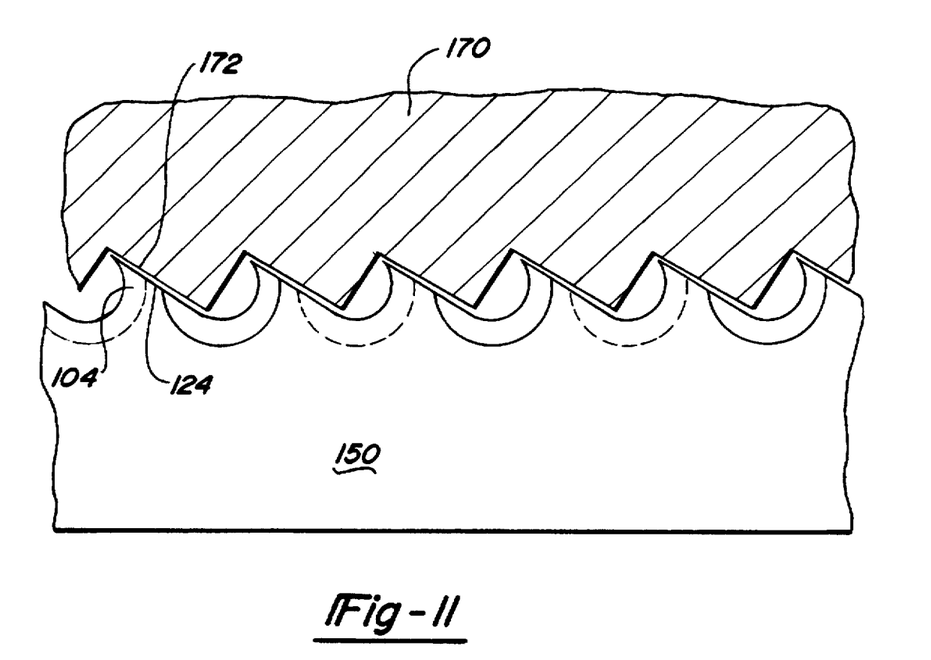
FIG. 11 illustrates an additional forming step of the manufacturing process of the present invention.

Either prior to or after the blanking operation depicted in FIG. 10 is completed, surfaces 124 are formed on saw blade 100 as illustrated in FIG. 11. A grinding wheel 170 having a plurality of grinding surfaces 172 grinds planar surface 124 on each tooth 104. Surface 124 as shown in FIG. 11 is generally perpendicular to faces 106 and 108 of body 102 and extends laterally across the entire width of tooth 104. Grinding wheel 170 is indexed into teeth 104 of saw blade 100 in the direction of arrow 174 until surface 124 is ground. This operation completes the forming of saw blade 100. Either before the grinding operation depicted in FIG. 11, or afterward, teeth 104 can be heat-treated in order to increase the hardness of teeth 104 if desired.

Figure 12A:
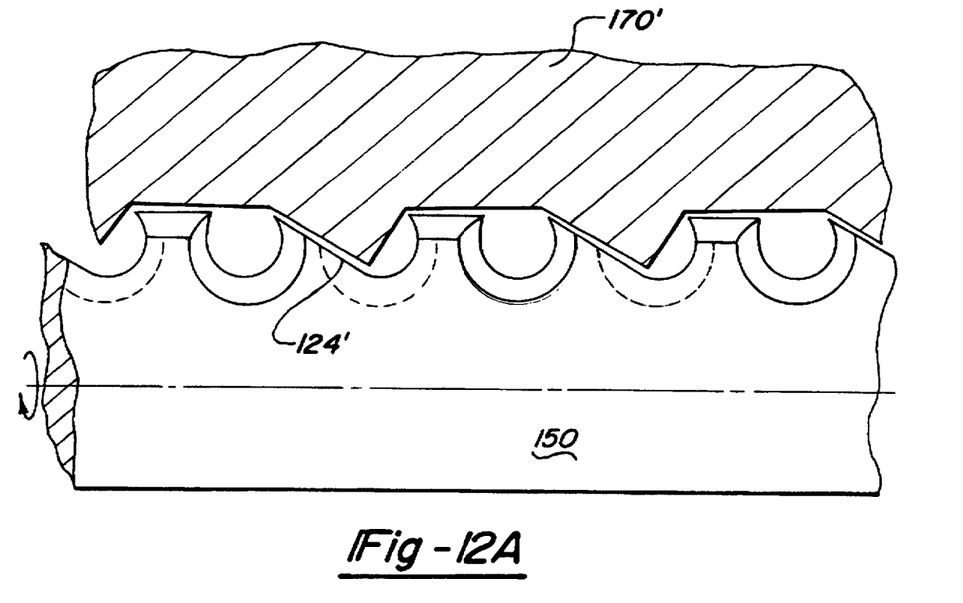
FIG. 12A illustrates a portion of the forming step shown in FIG. 11 but in accordance with an additional embodiment of the saw blade of the present invention.
Figure 12B:
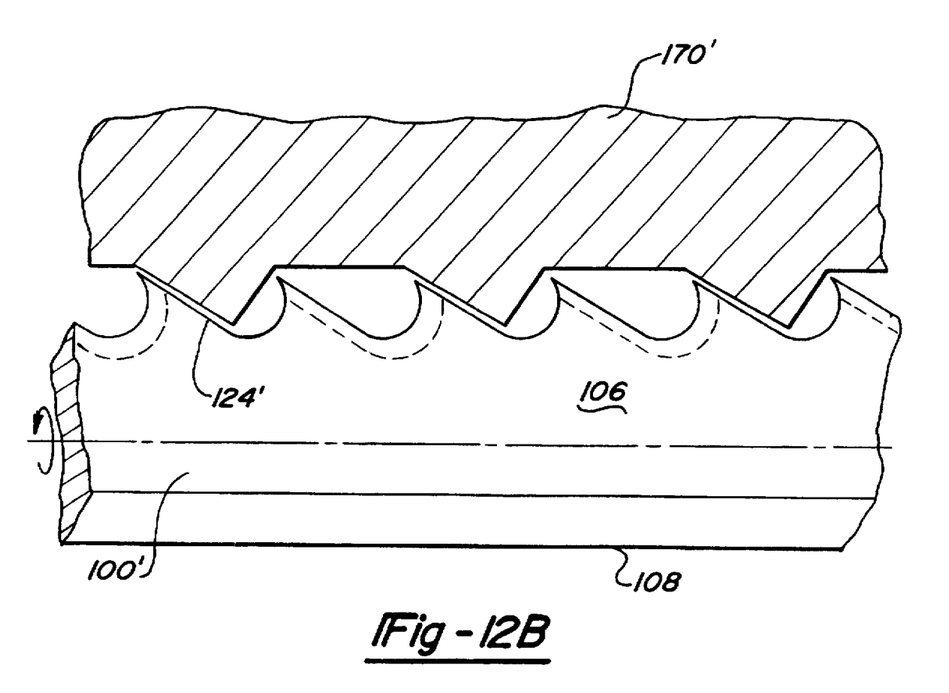
FIG. 12B illustrates the remaining portion of the forming step shown in FIG. 11 in accordance with the additional embodiment of the saw blade of the invention shown in FIG. 12A.

FIGS. 12A and 12B illustrate a grinding operation similar to that shown in FIG. 11 with the exception that the saw blade is rotated around its Z-axis (the longitudinal axis 113 of blade 100) prior to being ground by grinding wheel 170'. The rotation of the saw blade around its Z-axis produces a saw blade 100' which includes a ground surface 124' which is at an acute angle with respect to side faces 106 and 108 of saw blade 100', with the angle on one tooth 104' facing in the symmetrically opposite direction to the angle on the adjacent tooth 104' in alternate order throughout saw blade 100'. The angle between faces 106 and 108 of saw blade 100' is determined by the amount of rotation of saw blade 100' about its Z-axis. Surface 124' extends laterally across the entire width of saw blade 100'. FIG. 12A illustrates the grinding of the first one-half or every other tooth on saw blade 100'. FIG. 12B illustrates the grinding of the second one-half or the remaining every other tooth on saw blade 100'. The rotation around the Z-axis in FIG. 12B is equal to but opposite in direction to the rotation about the Z-axis shown in FIG. 12A.

Figure 4:
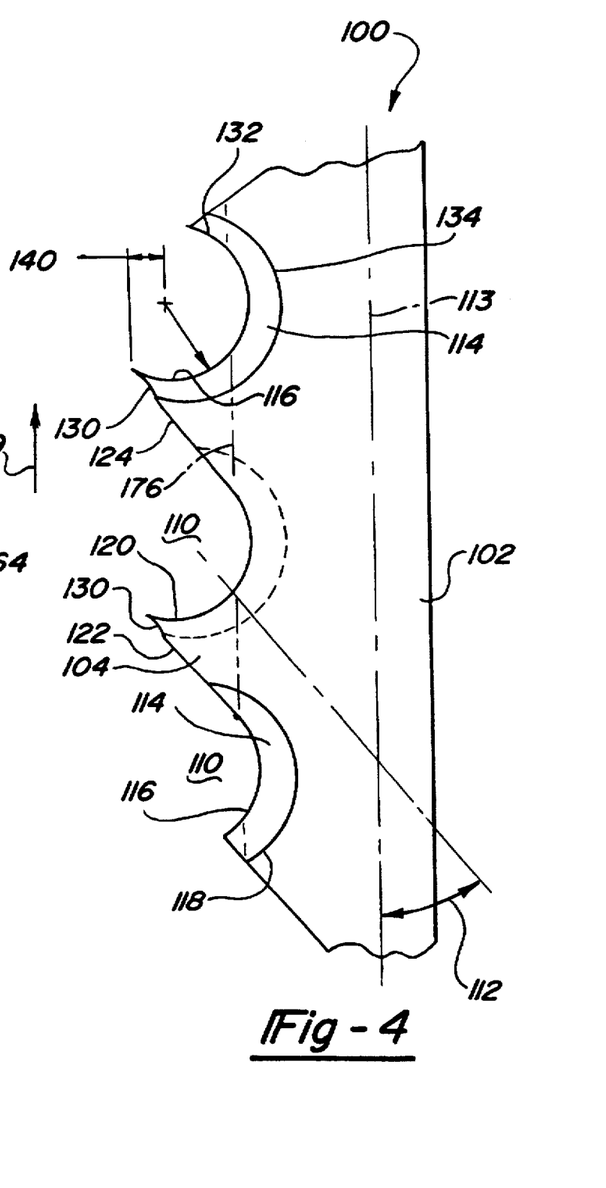
FIG. 4 is a side elevational view of a portion of a saw blade according to the present invention.
Figure 5:
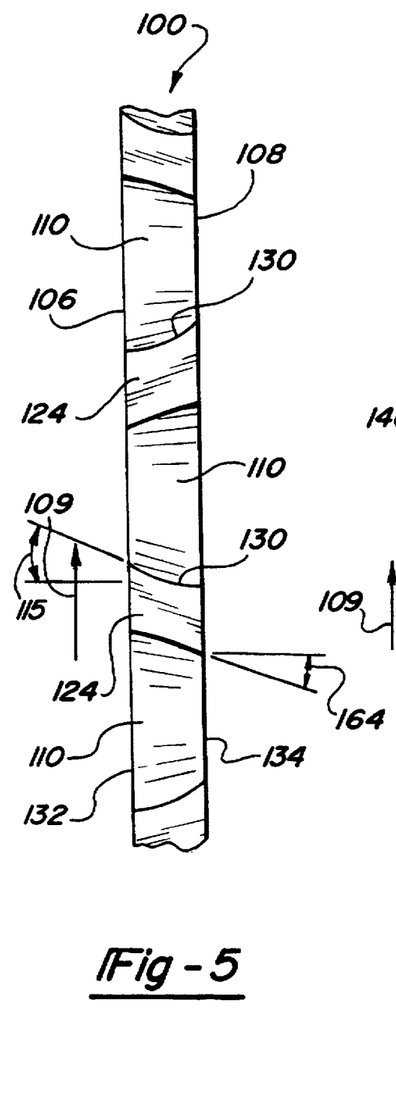
FIG. 5 is an edge view of the teeth of the portion of the saw blade shown in FIG. 4.
Figure 6:
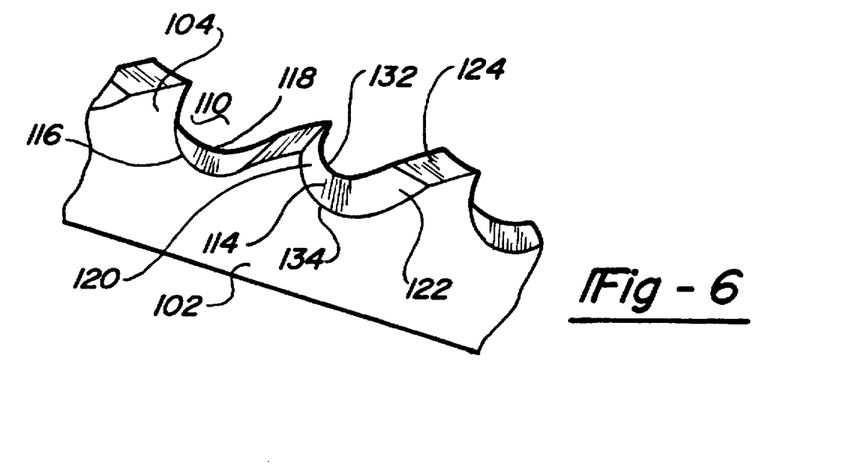
FIG. 6 is an enlarged perspective detail view showing the saw tooth profile according to the present invention.
Figure 6A:
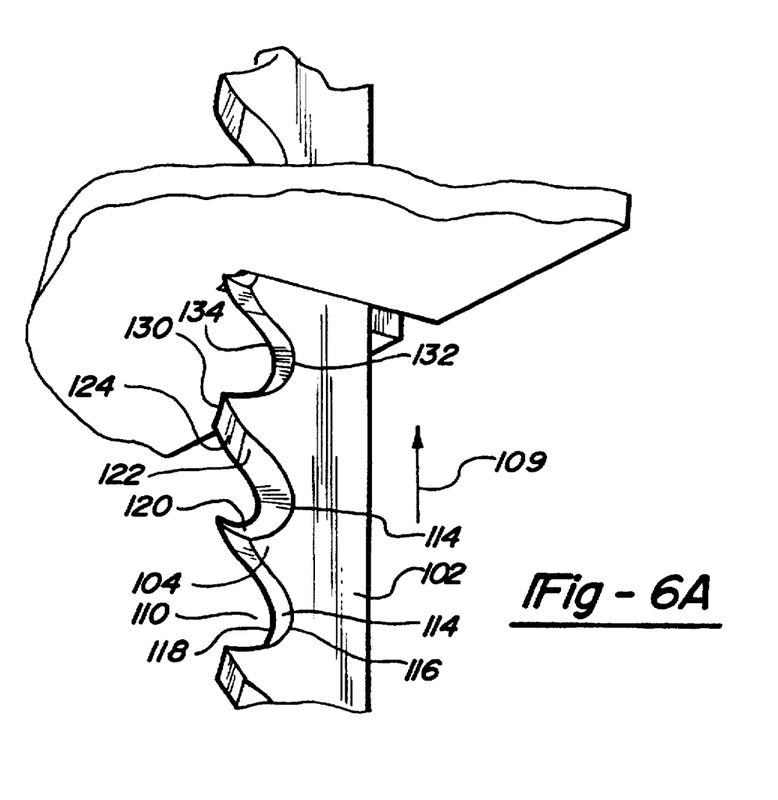
FIG. 6A is a perspective view of a saw blade in accordance with the present invention after cutting partially through an article.

It may be advantageous to manufacture saw blade 100 as a bi-metal strip of material or from a material which is manufactured using two different specifications of material. The tips of teeth 104 can be manufactured from a high carbon steel to enable the hardening of teeth 104 while body 102 of saw blade 100 can be manufactured from a lower carbon steel to limit the hardenability of body 102 and therefore maintain its ductility. If saw blade 100 is manufactured from a bi-metal strip of material, saw blade 100 will include a weld seam 176 as shown in phantom in FIG. 4. As can be seen in FIG. 4, both minor radius 116 and major radius 118 of radiused contours 114 in gullet 110 extend into the base or low hardenability material of body 102 to provide ductility to each tooth 104 while the tips of each tooth 104 are manufactured from the high hardenability material to maintain sharpness of cutting edges 130. Typical materials which can be used to manufacture saw blade 100 from a bi-metal strip of material include a high speed steel such as M2, M42 or similar material for the tips of the teeth with M42 being the preferred material and an alloy steel such as SAE 6150, D6A or similar material for the body with D6A alloy steel being the preferred material. In a similar manner, saw blade 100' could be manufactured from a bi-metal strip of material if desired.

Figure 13:
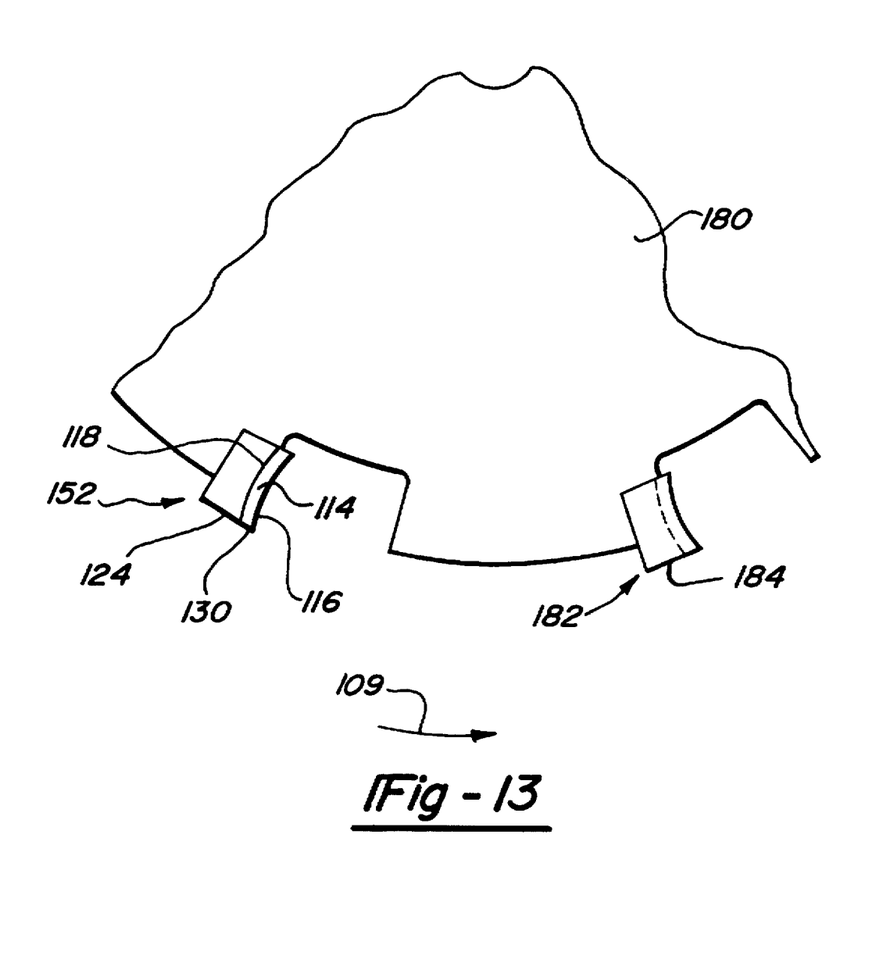
FIG. 13 is a side elevational view of another embodiment of the present invention where the tooth profile of the present invention is incorporated in a plurality of carbide inserts secured to a circular saw blade.

FIG. 13 shows another embodiment of the present invention, in which is illustrated a portion of a circular saw blade 180 having a plurality of teeth 182. Each tooth 182 comprises an insert 184 which is carbide or other relatively hard material. Insert 184 is secured to saw blade 180 in a conventional manner such as by brazing or other means known the art. Each insert 184 includes the cutting tooth profile of the present invention. Each insert 184 includes beveled contour 114 with its associated minor radius 116 and major radius 118. Each insert 184 is beveled in an opposite direction to the beveling of an adjacent insert 184 in alternate order throughout saw blade 180. Each insert 184 further includes surface 124 located on the trailing face of the insert and extending laterally across the width of the insert. Curved cutting edge 130 on the tip of each insert 184 is thus formed by beveled contour 114 and lateral surface 124. Thus, similar to the previous embodiments, each insert 184 is provided with the curved cutting edge 130 angled away from the direction of cut shown by arrow 109 or at what is defined as a negative rake angle. The beveled contours 114 and the negative rake angle of adjacent inserts 184 are angled in alternately opposite directions. Typical materials which can be utilized for inserts 184 include C2 and C4 cemented carbides with C4 cemented carbides being the preferred material.

FIG. 13 shows each insert 184 being beveled in an equal and opposite direction to the beveling of an adjacent insert 184 in alternate order throughout saw blade 180. It is within the scope of the present invention to individually vary the beveling of each insert in order to modify the performance of saw blade 180 if desired. In a similar manner, FIG. 13 shows each lateral surface 124 as being generally perpendicular to the side faces of each insert 184. It is within the scope of the present invention to individually vary the angle of each lateral surface 124 in order to modify the performance of saw blade 180 if desired.

While the above detailed description describes the preferred embodiment of the present invention, it should be understood that the present invention is susceptible to modification, variation and alteration without deviating from the scope and fair meaning of the subjoined claims.

What is claimed is:

1. A method of forming a tooth profile for a plurality of teeth on a saw blade having a specified tooth pitch, each of said plurality of teeth having a cutting edge, said method comprising the steps of:

providing a strip of raw material;

punching a plurality of holes in said strip of raw material;

simultaneously forming an angled surface having a large opening and a small opening within each of said plurality of holes such that every other hole of the plurality of holes define said large opening on a first side of said strip of raw material and remaining adjacent alternating holes of said plurality of holes define said large opening on a second opposing side of said strip of raw material throughout said strip of raw material; and grinding a plurality of planar surfaces on said strip of material intersecting said angled surfaces to create said cutting edges.

2. The method of forming the tooth profile according to claim 1, wherein each of said angled surfaces defines a minor radius and a major radius and said grinding step comprises grinding each of said plurality of planar surfaces generally tangent to a curve circumscribed by said minor radius of a respective angled surface.

3. The method of forming the tooth profile according to claim 1, wherein said step of punching the plurality of holes comprises:

punching a first one-half of said plurality of holes;

indexing said strip of raw material a specified distance; and punching a second one-half of said plurality of holes.

4. The method of forming the tooth profile according to claim 3, wherein the step of punching said first one-half of said plurality of holes comprises punching holes which are spaced at two times said tooth pitch and the step of punching said second one-half of said plurality of holes comprises punching holes which are spaced at two times said tooth pitch.

5. The method of forming the tooth profile according to claim 1, further comprising the step of blanking said saw blade from said strip of raw material.

6. The method of forming the tooth profile according to claim 1, wherein said grinding step grinds said planar surfaces generally perpendicular to side surfaces of said strip of raw material.

7. The method of forming the tooth profile according to claim 1, wherein said step of forming said angled surface within each of said plurality of holes, forms said angled surfaces such that adjacent holes are angled in opposite directions at equal angles in alternate order throughout said strip of material.

8. The method of forming the tooth profile according to claim 1, wherein said grinding step comprises:

indexing said strip of raw material around a longitudinal axis of said strip of raw material;

grinding a first plurality of surfaces on said strip of raw material to intersect said angled surfaces to create one-half of said cutting edges;

indexing said strip of raw material around said longitudinal axis; and grinding a second plurality of surfaces on said strip of raw material to intersect said angled surfaces to create the other one-half of said cutting edges.

9. A method of forming a tooth profile for a plurality of saw blade teeth having a specified tooth pitch, said method comprising the steps of:

providing a strip of raw material having a width;

punching a first plurality of holes in said strip of material to form a first portion of said plurality of teeth, adjacent holes of said first plurality of holes being spaced at two times said specified tooth pitch;

punching a second plurality of holes in said strip of material to form a second portion of said plurality of teeth, adjacent holes of said second plurality of holes being spaced at two times said specified tooth pitch;

simultaneously forming an angled surface having a large opening and a small opening within each of said first and second plurality of holes such that said first plurality of holes define said large opening on a first side of said strip of raw material and said second plurality of holes define said large opening on a second opposing side of said strip of raw material throughout said strip of raw material; and grinding a plurality of planar surfaces on said strip of raw material, each of said plurality of planar surfaces extending laterally across said strip of raw material to intersect said angled surfaces to create said plurality of saw blade teeth.

10. The method of forming the tooth profile according to claim 9, further comprising the step of indexing said strip of material by a specified distance after punching said first plurality of holes.

11. The method of forming the tooth profile according to claim 9, further comprising the step of blanking a saw blade from said strip of material.

12. The method of forming the tooth profile according to claim 9, wherein said grinding step grinds said planar surfaces generally perpendicular to side surfaces of said strip of raw material.

13. The method of forming the tooth profile according to claim 9, wherein said forming step forms said angled surfaces such that adjacent holes are angled in opposite directions at equal angles in alternate order throughout said strip of raw material.

14. The method of forming the tooth profile according to claim 9, wherein said grinding step comprises:

indexing said strip of raw material around a longitudinal axis of said strip of raw material;

grinding a first plurality of surfaces on said strip of raw material to intersect said angled surfaces to create one-half of said plurality of saw blade teeth;

indexing said strip of raw material around said longitudinal axis; and grinding a second plurality of surfaces on said strip of raw material to intersect said angled surfaces to create the other one-half of said plurality of saw blade teeth.

15. A method of forming a tooth profile for a plurality of teeth on a saw blade having a specified tooth pitch, each of said plurality of teeth having a cutting edge, said method comprising the steps of:

providing a strip of raw material;

punching a plurality of holes in said strip of raw material;

simultaneously forming a frusto-conical surface having a large diameter portion and a small diameter portion within each of said plurality of holes such that every other hole of the plurality of holes define said large diameter portion on a first side of said strip of raw material and remaining adjacent alternating holes of said plurality of holes define said large diameter portion on a second opposing side of said strip of raw material throughout said strip of raw material; and grinding a plurality of planar surfaces on said strip of material intersecting said beveled surfaces to create said cutting edges.

\* \* \* \* \*